(No Model.)
P. GENDRON.
METHOD OF ELECTRIC WELDING.
No. 466,825. Patented Jan. 12, 1892.
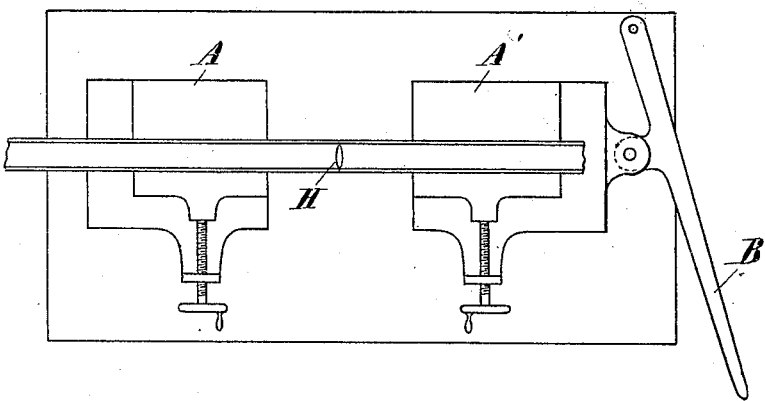
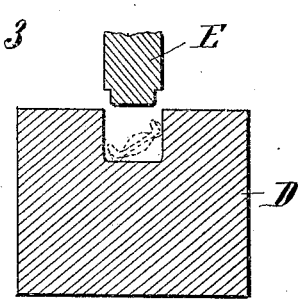
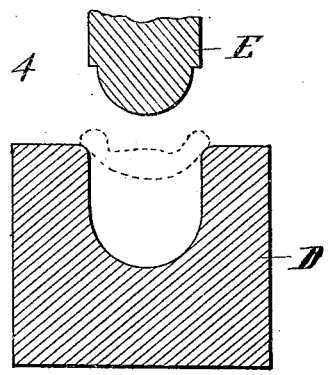
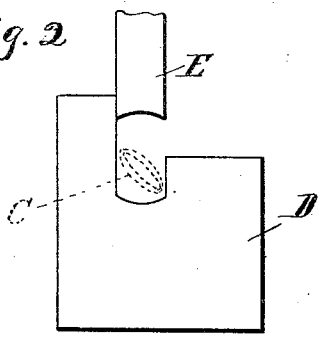
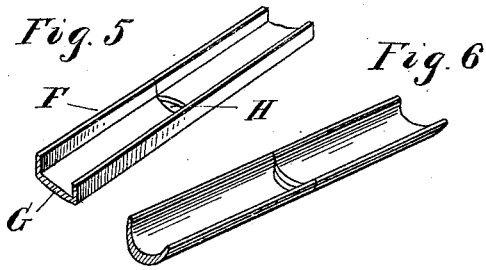
Witnesses:
P. M. Hulbert
N. L. Lindop
Inventor:
Peter Gendron
By Thos. A. Sprager
Attys.

UNITED STATES PATENT OFFICE.

PETER GENDRON, OF TOLEDO, OHIO, ASSIGNOR TO THE GENDRON IRON WHEEL COMPANY, OF SAME PLACE.

METHOD OF ELECTRIC WELDING.

SPECIFICATION forming part of Letters Patent No. 466,825, dated January 12, 1892.

Application filed June 17, 1891. Serial No. 396,542. (No model.)

*To all whom it may concern:*

Be it known that I, PETER GENDRON, a citizen of the United States, residing at Toledo, in the county of Lucas and State of Ohio, have invented certain new and useful Improvements in Methods of Electric Welding, of which the following is a specification, reference being had therein to the accompanying drawings.

This invention relates to new and useful improvements in methods of electric welding; and the invention consists in the improved method of forming the weld between two pieces and in restoring the upset or enlarged portion to the size and shape of the pieces which are welded, all as more fully hereinafter described.

In the present state of the art in electric welding the bent ends of the material are brought together by means of clamps adjustable to and from each other, a current of electricity is passed through, the clamps are made to again approach, and the weld is formed, forming at the point of juncture a burr or enlargement. In this process of welding where material like channel-iron, angle-iron, &c., is to be welded, or in any iron having different parts of varying mass or thickness, if the two ends are cut off square and brought together the thinner portions will begin to melt before the thinner portions are properly welded and the welding of the thicker portions will be imperfect on account of the burning of the metal, while the welding of the thicker portions will be imperfect on account of not being sufficiently heated.

The object of my invention is to reduce the burr formed by the end pressure of the metal and to so proportion the contacting parts as to make a perfect weld under all circumstances.

In the the drawings, Figure 1 is a plan view of a part of an apparatus which may be employed in electric welding. Fig. 2 is an elevation of a pair of dies employed in reducing the burr on the metal. Figs. 3 and 4 are a section through the dies for the same purpose employed in operating on metal of different cross-sections. Figs. 5 and 6 are detached perspective views of the abutting ends of channel and half-round iron.

A A' are clamps between which the metal can be welded, and B is a lever for moving the clamps to or fro. Any other suitable construction may be employed for this purpose.

When the weld has been accomplished in the manner before described, a burr (shown at C in Fig. 2) is formed around the point at which the weld is made, and to reduce this to its normal size I place it while hot between the dies D and E, these dies being of such shape and size as to reduce the burr to the same cross-section at the point where the weld is made as at the other points in the length of the bars to be welded.

In Fig. 3 I have shown dies of the shape used in channel-iron, and in Fig. 4 I have shown the dies to be used in half-round iron.

Before bringing the abutting ends of the metal together I cut out the ends, as shown in Figs. 5 and 6, bringing together the thinnest point and separating the thicker parts in proportion to their mass. In the channel-iron shown in Fig. 5 the flanges F are thinner than the body portion G, and therefore I cut out the body portion, as shown at H, cutting it in the arc of a circle as it increases in thickness toward the middle. In bringing the parts together the thinnest parts will first be welded, and as the lever B is moved the thicker parts will be made to gradually approach and come in contact in proportion to their mass, and I thus obtain a perfect weld across the entire face of the abutting ends without danger of burning at any point. It will be seen that the shoulder I in Fig. 4 is rounded off. This allows the tire to be forced into the die without cutting off any of the metal at the edges. Thus I am assured of the same size for each weld and can accurately figure on the expansion of the tire in the die.

What I claim as my invention is—

1. The herein-described improvement in method of electric welding, consisting in shaping the abutting ends of the material to have contact at points in proportion to the mass, heating them by a current of electricity, and subjecting them to end pressure, substantially as described.

2. The herein-described improvement in method of electric welding, consisting in shaping the ends of the material to be welded to have contact at the smallest points, with a gradually-increasing separation toward the points of greatest mass, heating them by a current of electricity, and subjecting them to end pressure, substantially as described.

3. The herein-described method of electric welding, consisting in shaping the abutting ends of the material to have contact at points in proportion to the mass, heating them by a current of electricity, subjecting them to end pressure, and finally subjecting the burr to pressure of suitable dies, substantially as described.

In testimony whereof I affix my signature in presence of two witnesses.

PETER GENDRON.

Witnesses:
JAMES WHITTEMORE,
M. B. O'DOGHERTY.